(12) United States Patent
Grun et al.

(10) Patent No.: US 9,777,488 B2
(45) Date of Patent: *Oct. 3, 2017

(54) FLOOR COVERING AND METHOD FOR PRODUCING THE SAME

(75) Inventors: Gregor Grun, Zweibrucken (DE); Mario Kroger, Bruchsal (DE); Dieter Rischer, Abtsteinach (DE)

(73) Assignee: NORA SYSTEMS GMBH, Weinheim (DE)

( * ) Notice: Subject to any disclaimer, the term of this patent is extended or adjusted under 35 U.S.C. 154(b) by 501 days.

This patent is subject to a terminal disclaimer.

(21) Appl. No.: 13/816,119

(22) PCT Filed: Aug. 5, 2011

(86) PCT No.: PCT/EP2011/003938
§ 371 (c)(1),
(2), (4) Date: Feb. 8, 2013

(87) PCT Pub. No.: WO2012/028241
PCT Pub. Date: Mar. 8, 2012

(65) Prior Publication Data
US 2013/0150518 A1    Jun. 13, 2013

(30) Foreign Application Priority Data

Sep. 1, 2010   (DE) .................. 10 2010 036 122

(51) Int. Cl.
| | | |
|---|---|---|
| *E04F 15/10* | (2006.01) | |
| *B29C 43/30* | (2006.01) | |
| *B29C 70/64* | (2006.01) | |
| *B29D 99/00* | (2010.01) | |
| B29C 35/02 | (2006.01) | |
| B29K 9/06 | (2006.01) | |
| B29L 31/30 | (2006.01) | |
| B29L 31/00 | (2006.01) | |

(52) U.S. Cl.
CPC ............ *E04F 15/105* (2013.01); *B29C 43/30* (2013.01); *B29C 70/64* (2013.01); *B29D 99/0057* (2013.01); *B29C 35/02* (2013.01); *B29K 2009/06* (2013.01); *B29K 2995/002* (2013.01); *B29L 2031/3017* (2013.01); *B29L 2031/732* (2013.01)

(58) Field of Classification Search
CPC . B09L 2031/732; B29C 70/64; B09D 99/005; E04F 15/105
See application file for complete search history.

(56) References Cited

U.S. PATENT DOCUMENTS

2001/0005542 A1   6/2001 Graab et al.
2008/0020179 A1*  1/2008 Graab et al. .................. 428/141

FOREIGN PATENT DOCUMENTS

| EP | 1 884 607 A2 | 2/2008 |
|---|---|---|
| JP | 2003261716 A | 9/2003 |
| JP | 2005 290607 A | 10/2005 |

OTHER PUBLICATIONS

Machine translation of JP 2005/290607, 2005.*
Korean Office Action in Korean Patent Application No. 10-2013-7008135 dated Aug. 18, 2015 and English translation.

* cited by examiner

*Primary Examiner* — Wenwen Cai
(74) *Attorney, Agent, or Firm* — Greer, Burns & Crain, Ltd.

(57) ABSTRACT

A floor covering including one of a sheet-shaped or plate-shaped matrix made of an elastomeric material. The matrix is provided with particles made of a thermoplastic material, where the elastomeric material of the matrix and the thermoplastic material of the particles each have at least one matching monomer.

4 Claims, 2 Drawing Sheets

FLOOR COVERING AND METHOD FOR PRODUCING THE SAME

BACKGROUND

The invention relates to a floor covering, comprising an essentially sheet-shaped or plate-shaped matrix made of an elastomeric material, wherein the matrix is provided with particles.

Such a floor covering is known from German patent DE 198 48 137 B4. The floor covering shown there is provided with particles in order to impart it with color, these particles being scattered onto the base material that has been shaped into a sheet. The particles consist of an unvulcanized rubber material. The subsequent heat treatment softens the particles so that they are deformed through the effect of mechanical forces. This gives rise to a homogeneous bonding of the particles. The particles are firmly incorporated into the matrix through the action of mechanical forces and high temperatures.

When non-cross-linking particles are used, for example, thermoplastic materials, however, their incorporation into the matrix of the floor covering is problematic. Up to now, the incorporation of the particles was improved through the use of an adhesion agent. The adhesion agent, however, causes additional costs and is complicated to process.

SUMMARY

It is object of the invention to create a floor covering that is provided with particles that are easily and firmly incorporated into the matrix.

In order to achieve the objective, the elastomeric material of the matrix and the thermoplastic material of the particles each have at least one matching monomer.

The identical monomers of the two components have good adhesive properties relative to each other, resulting in an especially good adhesion of the particles in the matrix. The adhesion can be improved even further by using an adhesion agent. When styrene butadiene rubber (SBR) is used, a synthetic material that is often used for the production of floor coverings, the styrene as well as the butadiene can be a monomer that matches a monomer in the thermoplastic material. Examples of such thermoplastic materials are polystyrene (PS) and styrene butadiene block copolymer (SBS).

The elastomeric material of the matrix can be made of a thermoplastic elastomer or of a rubber. Floor coverings made of such materials have advantageous properties of use such as non-slip characteristics, impact sound insulation and low electrostatic charging. Furthermore, the polymers can be selected in such a way that the floor covering also shows an advantageous, especially low-emission, fire behavior. Advantageous materials for the matrix of the floor covering are nitrile butadiene rubber (NBR), styrene butadiene rubber (SBR), butadiene rubber (BR), ethylene propylene diene monomer rubber (EPDM), natural rubber (NR) and isoprene rubber (IR).

The thermoplastic material can be configured as a thermoplastic elastomer. Thermoplastic elastomers (TPE) are plastics that, at room temperature, have properties comparable to those of an elastomer and that, at high temperatures above the softening temperature and/or the melting temperature, have properties comparable to those of a thermoplastic. As a result, an object made of thermoplastic elastomer has a relatively low hardness and a rubber-like resilience at room temperature. At high temperatures, the cross-linking points of the thermoplastic elastomer are reversibly detached so that the material can be processed by means of thermoplastic shaping methods, for example, in injection molding or extrusion systems, wherein the elastomeric properties are restored after the material has cooled off.

The particles can be configured at least partially to be transparent. Particularly thermoplastic elastomers are available in a wide range of colors and especially also in transparent form, wherein especially the use of a transparent thermoplastic elastomer allows the production of a partially transparent floor covering or else, if the particles are colored, of a partially translucent floor covering. Furthermore, the floor covering can be made in such a way that it is translucent. Here, it is especially advantageous that a transparent thermoplastic elastomer can be made in a hardness that essentially corresponds to the hardness of the vulcanized elastomeric material of the matrix. Thus, it is possible to produce a floor covering that has similar properties over its entire surface area. In contrast, a transparently configured vulcanizable elastomeric material always has lower hardness than the matrix so that the floor covering does not have continuously uniform properties.

The transparently configured thermoplastic material can also be provided with effect pigments. Effect pigments give the floor covering angle-dependent variations in the color tone or gloss. They are usually made of metallic particles having specific optical properties. The effect of such pigments appears particularly clearly in transparent materials, wherein the pigments are especially firmly incorporated into the matrix of the transparent thermoplastic material.

The elastomeric material and the thermoplastic material can be provided with fillers, wherein the portion of fillers in the elastomeric material is higher than the portion of fillers in the thermoplastic material. In the materials that are used for the floor covering, fillers improve the properties of floor-covering materials that are desirable for a floor covering. However, most fillers, for instance, carbon black, impair the transparency of the thermoplastic material. Therefore, the portion of fillers in the transparent material is preferably lower than the portion of fillers in the elastomeric material. Due to the considerably higher portion of elastomeric material, however, all in all, a floor covering with the desired advantageous properties is obtained.

The particles can be made from semi-finished products. For this purpose, the thermoplastic elastomer undergoes a shaping process before being scattered onto the matrix. Advantageous shaping processes are conventional thermoplastic shaping processes such as injection molding and extrusion. These methods can be used to produce particles in a wide variety of shapes. Possible shapes are free forms made by injection molding processes, cylindrical sections with a round, circular ring-shaped, star-shaped or oval cross sections. Furthermore, the particles can be configured in the form of strings of any desired length or in the form of bands with any desired cross section. These strings or bands can be applied onto the elastomeric material in ordered patterns such as, for instance, stripes or helical shapes, or in random patterns such as, for example, in a spaghetti pattern. In order to produce the particles, injection molding or extrusion is used to make an extruded profile that can subsequently be cut to the desired length. It is also possible to first make a flat layer and to then shred it into irregular particles.

Preferably, the thermoplastic material is selected in such a way that its softening temperature and/or melting temperature lies below the vulcanization temperature of the elastomeric material. As a result, the particles melt during the vulcanization of the elastomeric material of the matrix at least in the edge areas and a mutual penetration occurs at the boundary surface of the particles. After the vulcanization has been completed, the particles are especially firmly incorporated into the matrix of the floor covering.

The elastomeric material and the thermoplastic material can contain styrene and/or butadiene and/or ethylene and/or propylene and/or isoprene as the matching monomer. These monomers are monomers that are often used in plastics chemistry, both for thermoplastic materials as well as for elastomeric materials.

Several embodiments of the floor covering according to the invention are explained in greater detail below on the basis of the examples.

Figure 1:
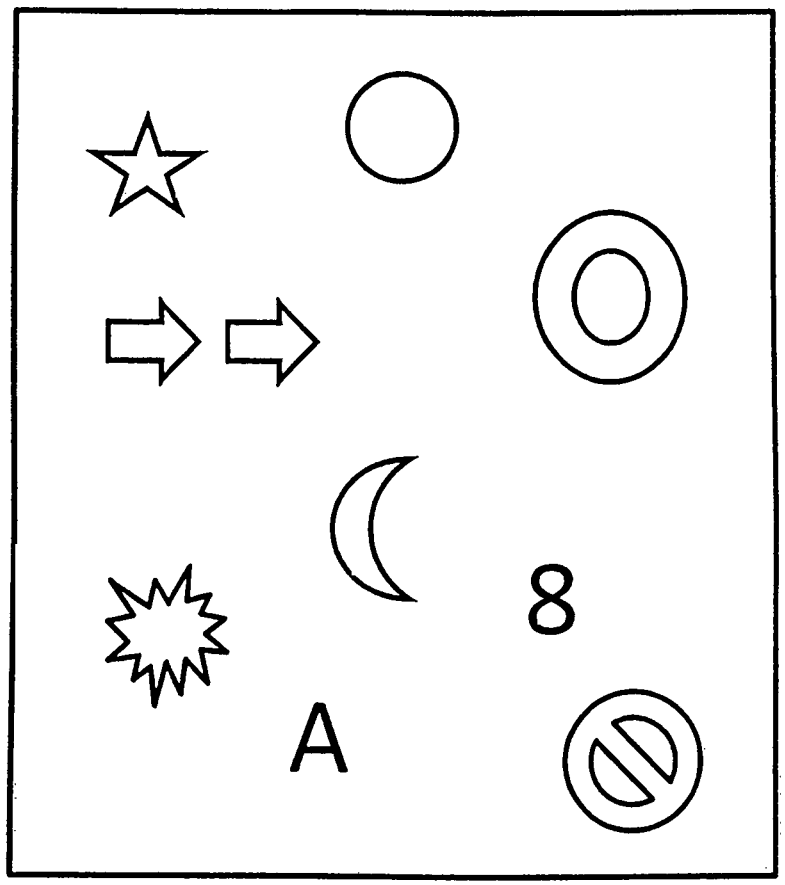
FIG. 1 is a schematic view of an embodiment of the present floor covering.

By way of an example, FIG. 1 shows a layable floor covering with a matrix of elastomeric material that is provided with particles made of thermoplastic material. The particles are transparent, made from semi-finished products, and thus available in a wide variety of shapes. Merely by way of an example, the figure shows particles having circular, annular, half-moon-shaped and star-shaped cross sections.

Figure 2:
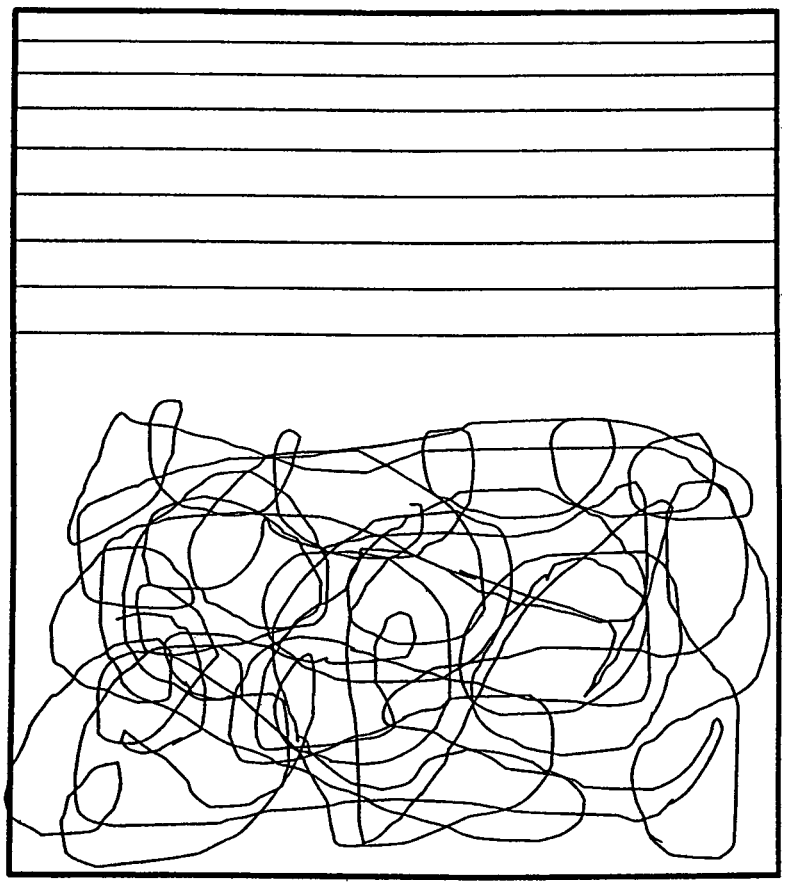
FIG. 2 is a schematic view of another embodiment of the present floor covering.

By way of an example, FIG. 2 shows a floor covering according to FIG. 1, wherein the particles in this embodiment are configured in the form of bands and strings. FIG. 2 also shows the arrangement of the particles in the form of strips and as a random spaghetti pattern.

EXAMPLE 1

Example 1 shows a floor covering with a plate-shaped matrix made of elastomeric material; in this embodiment, it is made of styrene butadiene rubber (SBR). The matrix is provided with transparent particles made of a thermoplastic elastomer; in this embodiment, it is styrene butadiene block copolymer (SBS). The thermoplastic elastomer can be additionally provided with effect pigments. The elastomeric material of the matrix and the thermoplastic material of the particles have styrene as the matching monomer. The elastomeric material and the thermoplastic material are provided with fillers in order to improve the material properties, wherein the content of fillers is higher in the elastomeric material than in the thermoplastic material. Furthermore, the SBS has a softening temperature of 95° C., which is below the vulcanization temperature of approximately 180° C. that applies to SBR.

Additional material combinations according to the invention are shown in the table below.

In order to produce the particles, first of all, an extruded profile was produced by means of extrusion as a semi-finished product that was subsequently cut to size. This gave rise to particles with a prescribed profile in a prescribed length. The so prepared particles were scattered onto a plate-shaped elastomeric material, shaped into a sheet by means of calanders, and subjected to a heat treatment in order to vulcanize the SBR. Due to the matching monomer, namely, styrene, the particles are firmly incorporated into the matrix of the floor covering.

In another advantageous embodiment, the particles are configured in the form of bands or strings.

EXAMPLE 2

Example 2 shows a floor covering with a plate-shaped matrix made of an elastomeric material; in this embodiment, it is made of nitrile butadiene rubber (NBR). The matrix is provided with particles of different colors made of a thermoplastic elastomer; in this embodiment, it is made of styrene butadiene block copolymer (SBS). The elastomeric material of the matrix and the thermoplastic material of the particles contain butadiene as the matching monomer.

In order to produce the particles, first of all, free forms were made by means of injection molding. Furthermore, the elastomeric material was shaped into a sheet, subsequently the particles were scattered onto the sheet and subjected to a heat treatment in order to vulcanize the SBR. Due to the matching monomer, namely, butadiene, the particles are firmly incorporated into the matrix of the floor covering.

EXAMPLE 3

Example 3 shows a floor covering with a plate-shaped matrix made of an elastomeric material; in this embodiment, it is made of styrene butadiene rubber (SBR). The matrix is provided with transparent particles made of a thermoplastic material; in this embodiment, it is polystyrene (PS). Metallic effect pigments are incorporated into the thermoplastic material. The elastomeric material of the matrix and the thermoplastic material of the particles have styrene as the matching monomer.

In order to produce the particles, first of all, a flat layer was made by means of extrusion as the semi-finished product, which was subsequently shredded to form particles. This gave rise to randomly shaped particles. The elastomeric material was shaped into a sheet by means of calanders, subsequently the particles were scattered onto the sheet, calandered once again, and the sheet provided with the particles was subjected to a heat treatment in order to vulcanize the SBR. Due to the matching monomer, namely, styrene, the particles are firmly incorporated into the matrix of the floor covering.

The following table shows material combinations according to the invention made up of elastomeric materials and thermoplastic materials for the production of a floor covering described according to the examples:

| Matrix | Particle |
| --- | --- |
| nitrile butadiene rubber (NBR) | SBS (styrene butadiene block copolymer) |
| styrene butadiene rubber (SBR) | SBS |
| SBR | SEBS (hydrogenated SBS) |
| SBR | (styrene isoprene block copolymer) |
| SBR | SEBS |
| butadiene rubber (BR) | SBS |
| ethylene propylene diene monomer rubber (EPDM) | SEBS |
| natural rubber (NR) | SIS |
| isoprene rubber (IR) | SIS |
| ethylene propylene diene monomer rubber (EPDM) | polyethylene (PE) |
| EPDM | polypropylene (PP) |
| NBR | polyacrylonitrile (PAN) |

-continued

| Matrix | Particle |
|--------|----------|
| NBR | acrylonitrile butadiene styrene copolymer |
| SBR | polystyrene (PS) |

The invention claimed is:

1. A floor covering, comprising one of a sheet-shaped or plate-shaped matrix made of a vulcanized elastomeric material that is rubber, wherein the matrix is provided with particles made of a transparent thermoplastic elastomer, wherein the transparent thermoplastic elastomer is selected such that at least one of a softening temperature and a melting temperature of the transparent thermoplastic elastomer lies below the vulcanization temperature of the rubber material, and the vulcanized elastomeric material of the matrix includes a first monomer and the transparent thermoplastic elastomer of the particles includes a second monomer, wherein said first monomer and said second monomer are the same, and wherein a hardness of the vulcanized elastomeric material is 40 to 90 Shore A and a hardness of the transparent thermoplastic elastomer is 40 to 90 Shore A, and wherein the matrix and the particles are made with different materials.

2. The floor covering according to claim 1, wherein effect pigments are incorporated into the particles.

3. The floor covering according to claim 1, wherein the rubber material and the transparent thermoplastic elastomer are provided with fillers, and wherein the portion of fillers in the rubber material is higher than the portion of fillers in the transparent thermoplastic elastomer.

4. The floor covering according to claim 1, wherein the rubber material and the transparent thermoplastic elastomer contain at least one of: styrene, butadiene, ethylene, propylene and isoprene as the first monomer and the second monomer.

* * * * *